United States Patent [19]

Zhao et al.

[11] Patent Number: 5,763,012
[45] Date of Patent: Jun. 9, 1998

[54] COATING OF SUBSTRATES

[75] Inventors: Cheng-Le Zhao, Schwetzingen; Eckehardt Wistuba, Bad Dürkheim; Joachim Roser, Mannheim, all of Germany; Paul Fitzgerald; Jan Spitzer, both of Charlotte, N.C.

[73] Assignee: BASF Aktiengesellschaft, Ludwigschafen, Germany

[21] Appl. No.: 720,977

[22] Filed: Oct. 16, 1996

[51] Int. Cl.[6] ........................................ B05D 7/02
[52] U.S. Cl. .......................................... 427/393.5
[58] Field of Search .............................. 427/393.5

[56] References Cited

U.S. PATENT DOCUMENTS

| | | | |
|---|---|---|---|
| 4,952,623 | 8/1990 | Auchter | 524/517 |
| 4,980,411 | 12/1990 | Beckerle et al. | 524/524 |
| 5,070,136 | 12/1991 | Dersch et al. | 524/555 |
| 5,208,282 | 5/1993 | Rehmer et al. | 524/190 |
| 5,614,582 | 3/1997 | Hori et al. | 524/507 |

*Primary Examiner*—Erma Cameron
*Attorney, Agent, or Firm*—Oblon, Spivak, McClelland, Maier & Neustadt, P.C.

[57] ABSTRACT

The present invention relates to a method of coating substrates, especially those with a hydrophobic surface, in which the substrate to be coated is coated with a coating composition whose binder is a formulation comprising an aqueous polymer dispersion in which the polymer has carbonyl or oxirane groups (component a)), and at least one compound having at least two $NH_2$ groups per molecule, is applied to the substrate to be coated [sic]. It also relates to coating compositions including such binder formulations, and furthermore to a method of sealing using a sealing composition including such formulations as its binder.

15 Claims, No Drawings

COATING OF SUBSTRATES

The present invention relates to a method of coating substrates, in which a coating composition whose binder is a formulation comprising an aqueous dispersion of a polymer which has functional groups, and at least one compound having two or more $NH_2$ groups per molecule, is applied to the substrate which is to be coated. The present invention also relates to coating compositions comprising such a formulation, which are suitable for the coating of substrates, especially hydrophobic substrates such as polyurethane foams or EPDM components. The present invention relates furthermore to a method of sealing using a sealing composition comprising such formulations as binder.

Construction materials are often sealed with coating compositions in order to protect against environmental effects, including the processes of weathering. Examples of such environmental effects, especially outdoors, are sunlight, fluctuating temperatures, moisture, the chemical effects of increasing pollution, and mechanical effects as well. To be suitable, coating compositions must be stable toward the environmental conditions mentioned, ie. they should have little water uptake tendency, high photostability, and high resistance to oxidizing conditions as may occur, in particular, when intense solar irradiation and polluted air act in combination. The compositions must also be of high mechanical stability, especially high tensile strength, so that the dimensional changes in the components, induced by fluctuating temperatures, do not lead to cracks being formed. Moreover, this is a property which they must not lose at low temperatures. Conversely, at high temperatures they must not become tacky, which would lead to unwanted soiling. A further quality desirable in the coating compositions is the ability to reflect light and heat, so as to avoid extreme temperature fluctuations in the construction materials. Good adhesion of the coating compositions to the substrate to be sealed is of particular importance, especially in the case of hydrophobic construction materials, such as polyurethane foams, or components made of EPDM plastics, to which the adherence of conventional coating compositions is poor.

The properties required of the coating compositions depend largely on the particular binder used. Thus W. A. Zissmann (Advances in Chemistry, Series 43, Gould edition, ACS Washington 1964) showed that good adhesion to substrates with low surface tension and low polarity (hydrophobic substrates) is achieved if the binder polymers are in turn of low surface tension and low polarity. In general, the surface of polymer particles in polymer dispersions is populated by polar groups as a result, for example, of the adsorption of ionic surface-active substances. This restricts the choice of possible polymers and of surface-active substances. Moreover, the polymers used as binders should, as films, possess high tear strength and good extensibility. Further still, the binder polymers must possess a high pigment binding capacity in order to ensure the stability of the coating compositions.

There have been various reports of binder polymers which meet some of the properties desired. For instance, EP-A 187 505 describes a binder polymer which couples heightened tear strength with comparatively high flexibility. This polymer is obtained by reacting a primary latex in the swollen state with a monomer having at least two ethylenically unsaturated bonds. However, this two-stage process is highly complex and increases the cost involved in preparing such binder polymers.

U.S. Pat. No. 3,345,336 describes polymers having carbonyl groups which can be crosslinked with hydrazides of the polybasic carboxylic acids. In the crosslinked state these polymers are of high solvent resistance; they are used for treating leather, textiles and paper.

EP-B 258 988 describes a coating composition for polyurethane foams that includes a binder polymer having acetoacetyl or cyanoacetyl groups. A distinctive feature of the coating composition is its high degree of adhesion to the polyurethane foam. While the incorporated functional groups increase the tear strength of such binder polymers, there is at the same time a marked reduction in the extensibility of these coatings. This loss of extensibility is probably a consequence of crosslinking reactions by the reactive methylene and carbonyl groups of the abovementioned functional units present in the polymer.

It is the object of the present invention to provide a polymer-based binder which goes a long way toward meeting the desired set of properties.

We have found that this object is achieved, surprisingly, by formulations comprising aqueous polymer dispersions a) whose polymers include functional groups which are able to react with $NH_2$ groups to form stable bonds and are selected from keto groups and oxirane rings, and compounds b) which have two or more $NH_2$ groups, and that these formulations can be used as binders for coating compositions having the desired set of properties.

The present invention accordingly provides a method of coating substrates, in which a coating composition whose binder is a formulation comprising as component a) at least one aqueous dispersion of a polymer having functional groups —X—Y—$R^1$, where $R^1$ is hydrogen, alkyl, aryl or aralkyl, Y is C=O or an oxirane ring, —X— is a single bond, alkylene, arylene, —$R^2$—O—$R^3$—, —$R^2$—Z—O—$R^3$—, —$R^2$—Z—$CH_2$—$R^3$—, —$R^2$—Z—N($R^4$)—$R^3$—, —$R^2$—O—Z—O—$R^3$—, —$R^2$—O—Z—$CH_2$—$R^3$—, —$R^2$—O—Z—N($R^4$)—$R^3$—, —$R^2$—N($R^5$)—Z—O—$R^3$—, —$R^2$—N($R^5$)—Z—$CH_2$—$R^3$—, —$R^2$—N($R^5$)—Z—N($R^4$)—$R^3$—, where —$R^2$— is a single bond, alkylene, oxyalkylene, polyoxyalkylene or arylene and is attached to the polymer, —$R^3$— is alkylene or arylene and is attached to Y, Z is $SO_2$ or C=O, and $R^4$ and $R^5$ independently are hydrogen, alkyl, aryl, aralkyl or a group —$R^3$—Y—$R^1$, where Y, $R^1$ and $R^3$ are as defined above, and as component b) at least one compound having at least two $NH_2$ groups per molecule, is applied to the substrate which is to be coated.

The novel method is preferably suitable for coating hydrophobic substrates, which are understood to be surfaces having a surface tension <50 mN/m, preferably <40 mN/m and in particular <30 mN/m, and which are of low polarity, for example surfaces of polyurethane foams or polyurethane compositions, asphalt and bitumen compositions, components or structural compositions of polyolefins, such as polyethylene, polypropylene, EPM-EPDM polymers (EPM=ethylene-propylene rubber; EPDM=ethylene-propylene-diene rubber) or of polymer blends whose principal constituent comprises polyolefins.

Alkyl is preferably linear or branched $C_1$–$C_{12}$-alkyl, especially $C_1$–$C_8$-alkyl, for example methyl, ethyl, n-propyl, isopropyl, 1-butyl, 2-butyl, isobutyl, t-butyl, 1-pentyl, 2-pentyl, 3-pentyl, 1-hexyl or 2-ethylhexyl. Aryl is preferably phenyl or naphthyl each of which is unsubstituted or substituted by 1–4 groups selected independently from $C_1$–$C_4$-alkyl, especially methyl or ethyl, $C_1$–$C_4$-alkoxy, for example methoxy or ethoxy, hydroxyl (which may also be ethoxylated) and halogen. Alkylene is a divalent alkyl, preferably $C_1$–$C_{12}$-alkyl, for example methylene, 1,1- or 1,2-ethylene, 1,1-, 1,2-, 1,3- or 2,2-propylene. Arylene is a divalent aryl, preferably 1,2- or 1,4-phenylene. Aralkyl is aryl attached to the respective center via an alkylene. Oxyalkylene is alkylene attached to the polymer via an oxygen, and, correspondingly, polyoxyalkylene comprises alkylene units each linked to one another by oxygens.

The polymers present in the novel binder formulations have reactive centers Y which are able, without themselves reacting with one another, to undergo reaction with $NH_2$ groups to form a bond. Suitable reactive centers are carbonyls (CO) and oxirane rings. The reactive center Y is attached to the polymer either directly or via a bridge X. The reactive centers may carry the substituents customary for them. Consequently, the functional groups present in the polymers can be described by the formula —X—Y—$R^1$.

The reactive center Y is preferably carbonyl. $R^1$ is preferably hydrogen or alkyl, especially hydrogen or methyl. In the preferred embodiments the bridge X can be a single bond, a $C_1$–$C_6$-alkylene or, in particular, a group —$R^2$—Z—O—$R^3$— or —$R^2$—Z—N($R^4$)—$R^3$—. In such groups, $R^2$, $R^3$ and Z are as defined above, and preferably Z is CO, $R^2$ is a single bond or $C_1$–$C_4$-alkylene, and $R^3$ is $C_1$–$C_4$-alkylene, especially methylene, or is p-phenylene. $R^4$ is preferably hydrogen, $C_1$–$C_4$-alkyl or a group —$R^3$—Y—$R^1$, in which $R^1$, $R^3$ and Y are as defined above, preferably with those definitions already given above as being preferred for them. With particular preference, X, Y, Z, $R^1$, $R^2$, $R^3$, $R^4$, and $R^5$ all have the stated preferred definitions.

Polymers containing functional groups —X—Y—$R^1$ can be obtained in various ways. For instance, the reactive centers Y in the polymer can be produced by transforming the existing functionalities in a polymer-analogous reaction. Examples of this are the reaction of any double bonds in the polymer with epoxydization or carbonylization reagents, or the oxidation of aliphatic OH groups to carbonyls. The reactive centers Y can also be introduced into the polymer, in a polymer-analogous reaction, by means of low molecular mass compounds possessing one or more reactive centers Y and at least one different functional group which is able to react with the functional groups present in the polymer, forming bonds. This second type of reaction can be carried out, for example, by reacting any OH and/or $NH_2$ groups present in the polymer with compounds susceptible to nucleophilic substitution, for example epihalohydrins or α-halocarbonyl compounds.

Preferably, however, the polymers of component a) are prepared by free-radical copolymerization of at least one ethylenically unsaturated monomer A with at least one ethylenically unsaturated monomer B of the formula I

$$R^7\text{—CH}=\text{C}(R^6)\text{—X—Y—}R^1 \qquad (I)$$

where $R^6$ is hydrogen or methyl, $R^7$ is hydrogen, alkyl, aryl, aralkyl or a functional group —X—Y—$R^1$, and X, Y and $R^1$ are as defined above. R is preferably hydrogen. With very particular preference, the monomers B are the esters of α,β-ethylenically unsaturated $C_3$–$C_8$ mono- or dicarboxylic acids with alcohols which carry a carbonyl group, or are the amides of these carboxylic acids which carry, on the nitrogen, one or two carbonyl-containing substituents. Examples of suitable α,β-ethylenically unsaturated $C_3$–$C_8$ carboxylic acids are acrylic, methacrylic, crotonic, maleic, itaconic, citraconic and fumaric acids. Examples of suitable alcohols are glycol aldehyde, hydroxyacetone, β-hydroxypropanal, 1-hydroxybutan-2-one, 3-hydroxybutan-2-one, 4-hydroxybutan-2-one, 4-hydroxypentan-2-one, p-hydroxyacetonephenone [sic], etc. Examples of suitable substituents on the amide nitrogen are 1-oxoeth-2-yl, 1-oxoprop-2-yl, acetonyl, 2-oxobut-1-yl, 2-oxobut-3-yl, 2-oxobut-4-yl, 2-oxopent-4-yl or p-acetylphenyl. Bisacetonylacrylamide or bisacetonylmethacrylamide are specifically used as monomers B. Such monomers preferably make up from 0.1 to 10% by weight of the overall quantity of monomers.

Suitable monomers A are selected from vinyl-aromatic monomers such as styrene, α-methylstyrene, orthochlorostyrene or vinyltoluenes, $C_1$–$C_{12}$-alkyl vinyl ethers, such as methyl, ethyl, n-propyl, isopropyl, n-butyl, isobutyl and 2-ethylhexyl vinyl ethers, vinyl esters of $C_1$–$C_{18}$ monocarboxylic acids, such as vinyl acetate, propionate, butyrate, valerate, hexanoate, 2-ethylhexanoate, decanoate, laurate and stearate. Also suitable are esters of α,β-ethylenically unsaturated $C_3$–$C_8$ mono- or dicarboxylic acids with $C_1$–$C_{12}$, preferably $C_1$–$C_8$ and, in particular, $C_1$–$C_4$ alkanols or $C_5$–$C_8$ cycloalkanols. Examples of suitable $C_1$–$C_{12}$ alkanols are methanol, ethanol, n-propanol, isopropanol, 1-butanol, 2-butanol, isobutanol, tert-butanol, n-hexanol and 2-ethylhexanol. Examples of suitable cycloalkanols are cyclopentanol and cyclohexanol. Particularly suitable esters are those of acrylic, methacrylic, crotonic, maleic, itaconic, citraconic or fumaric acids. Specific examples are methyl, ethyl, n-butyl, isobutyl, 1-hexyl and 2-ethyl-hexyl (meth) acrylates, dimethyl maleate or di-n-buyl [sic] maleate. Nitriles of αβ-monoethylenically unsaturated $C_3$–$C_8$ carboxylic acids, such as acrylitrile or methacrylonitrile, are also suitable. In addition, it is also possible to employ $C_4$–$C_8$ conjugated dienes, such as 1,3-butadiene, isoprene or chloroprene.

The abovementioned monomers usually constitute the major proportion A1 of the monomers A and make up preferably from 80 to 99.9% by weight, in particular from 90 to 99.9% by weight, and especially from 95 to 99.7% by weight of the monomers A.

The monomers A also comprise modifying monomers A2 whose homopolymers are of increased solubility or swellability in water. These monomers are preferably incorporated into the polymer in quantities of from 0.1 to 20% by weight, in particular from 0.1 to 10% by weight, and especially from 0.2 to 2% by weight, based on the quantity of monomers A. Such monomers have the effect in particular of increasing the pigment binding power of the binder polymers. They include monomers containing acid groups, such as α,β-monoethylenically unsaturated $C_3$–$C_{10}$ mono- and dicarboxylic acids, and also aliphatic or aromatic vinylsulfonic acids and the water-soluble salts thereof. However, it should be noted here that a high content of acid groups in the binder polymer reduces the water resistance of coatings. For this reason, acidic monomers of this kind are preferably used only in quantities of less than 1% by weight and in particular not at all. However, it is preferred to use nonionic modifying monomers such as the amides, the N-alkylolamides or the hydroxyalkyl esters of said carboxylic acids, examples being acrylamide, methacrylamide, N-methylolacrylamide, N-methylolmethacrylamide, hydroxyethyl acrylate, hydroxyethyl methacrylate, hydroxypropyl acrylate, hydroxypropyl methacrylate, etc.

Crosslinking monomers A3 can also be copolymerized. If so, they are copolymerized in a minor quantity, generally up to 5% by weight and in particular up to 1% by weight, based on the quantity of the monomers A. These monomers A3 are preferably monomers having two nonconjugated, ethylenically unsaturated bonds, for example the diesters of dihydric alcohols with α,β-monoethylenically unsaturated $C_3$-$C_8$ carboxylic acids, for example glycol bisacrylate, or esters of α,β-unsaturated carboxylic acids with alkenols, for example bicyclo-decenyl (meth)acrylate.

The binder polymers may also include further monomers which increase the strength of the respective coating compositions, examples being monomers containing siloxane groups, such as the vinyltrialkoxysilanes, eg. vinyltrimethoxysilane, alkylvinyldialkoxysilanes or (meth) acryloyloxyalkyltrialkoxysilanes eg. (meth) acryloyloxyethyltrimethoxysilane, (meth) acryloyloxypropyltrimethoxysilane. These monomers can be used in quantities of up to 1% by weight, preferably from 0.05 to 0.5% by weight, based on the quantity of monomers A.

The properties of the coating compositions also depend on the glass transition temperature (DSC, midpoint temperature, ASTM D 3418-82). If too low, the coating remains tacky even after curing; if too high, the coating composition is of inadequate strength and loses its elasticity at low temperatures. The glass transition temperature of suitable binder polymers is therefore in general below 50° C., preferably below 25° and, with particular preference, below 10° C. In general, however, it is above –60° C., preferably above –45° C. and in particular above –35° C. In this context it is found useful to estimate the glass transition temperature, $T_g$, of the dispersed polymer. According to Fox (T.G. Fox, Bull. Am. Phys. Soc. (Ser. II) 1 [1956] 123 and Ullmanns Encyklopädie der technischen Chemie, Weinheim (1980), pp.17–18) the glass transition temperature of copolymers at high molar masses is given in good approximation by $$\frac{1}{T_g} = \frac{X^1}{T_g^1} + \frac{X^2}{T_g^2} + \ldots \frac{X^n}{T_g^n}$$

in which $X^1, X^2, \ldots X^n$ are the mass fractions $1, 2, \ldots, n$ and $T_g^1, T_g^2, \ldots, T_g^n$ are the glass transition temperatures of t e respective homopolymers synthesized from only one of the monomers $1, 2, \ldots, n$, in kelvins. The latter are known, for example, from Ullmann's Encyclopedia of Industrial Chemistry, VCH, Weinheim, Vol. A 21 (1992) p.169 or from J. Brandrup, E. H. Immergut, Polymer Handbook, 3rd ed., J. Wiley, New York 1989.

From the above it is evident that the glass transition temperature of a polymer can be established both by means of an appropriate principal monomer A1, having a glass transition temperature within the desired range, and by combining at least one monomer of high glass transition temperature with at least one monomer of low glass transition temperature. In a preferred embodiment, the monomers A1 are composed of 5 to 50% by weight of at least one monomer whose homopolymer has a glass transition temperature above 50° C., and from 50 to 95% by weight of at least one monomer whose homopolymer has a (lass transition temperature <0° C.

The aqueous polymer dispersions employed in accordance with the invention are prepared preferably by free-radical aqueous emulsion polymerization of said monomers A and B in the presence of at least one free-radical initiator, with or without a surface-active substance. One embodiment of the present invention uses polymers which are obtainable by polymerization in the absence of surface-active substances.

Suitable free-radical polymerization initiators are all those capable of initiating a free-radical aqueous emulsion polymerization. These include peroxides, for example alkali metal peroxodisulfates, and azo compounds. Use is also made of combined systems composed of at least one organic reducing agent and at least one peroxide and/or hydroperoxide, for example tert-butyl hydroperoxide with the sodium salt of hydroxymethanesulfinic acid, or hydrogen peroxide with ascorbic acid. Use is also made of combined systems which include a small quantity of a metal compound which is soluble in the polymerization medium and whose metallic component may occur in a plurality of valence states, eg. ascorbic acid/iron(II) sulfate/hydrogen peroxide, in which the ascorbic acid is often replaced by the sodium salt of hydroxymethanesulfinic acid, sodium sulfite, sodium hydrogen sulfite or sodium bisulfite, and the hydrogen peroxide by tert-butyl hydroperoxide or alkali metal peroxodisulfates and/or ammonium peroxodisulfate. The quantity of the free-radical initiator system used, based on the overall quantity of monomers to be polymerized, is preferably from 0.1 to 2% by weight.

Surface-active substances suitable for conducting the emulsion polymerization are the emulsifiers and protective colloids normally employed for these purposes. The surface-active substances are usually used in quantities of up to 10% by weight, preferably from 0.5 to 5% by weight and in particular from 0.5 to 3% by weight, based on the monomers to be polymerized.

Examples of suitable protective colloids are polyvinyl alcohols, starch derivatives and cellulose derivatives, or copolymers with vinylpyrrolidone. A detailed description of further suitable protective colloids can be found in Houben-Weyl, Methoden der organischen Chemie, Volume XIV/1, Makromolekulare Stoffe [Macromolecular substances], Georg-Thieme Verlag, Stuttgart 1961, pp. 411–420. Mixtures of emulsifiers and/or protective colloids can also be used. As surface-active substances it is preferred to employ exclusively emulsifiers, whose relative molecular weights, unlike those of the protective colloids, are usually below 2000. They may be anionic, cationic or else nonionic in nature. Anionic emulsifiers include alkali metal and ammonium salts of $C_8$-$C_{12}$-alkyl sulfates, of sulfuric acid half-esters of ethoxylated $C_{12}$-$C_{18}$ alkanols (EO units: 2 to 50) and of ethoxylated ($C_4$-$C_9$-alkyl)phenols (EO units: 3 to 50), of $C_{12}$-$C_{18}$-alkylsulfonic acids and of ($C_9$-$C_{18}$-alkyl) arylsulfonic acids. Other suitable emulsifiers can be found in Houben-Weyl, loc cit., pp. 192–208.

Preferred anionic surface-active substances are compounds of the formula II

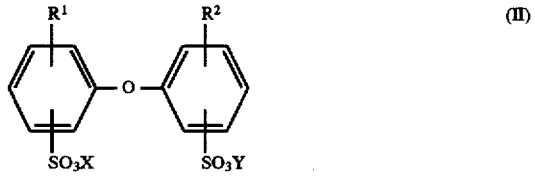

where $R^1$ and $R^2$ are hydrogen or $C_4$-$C_{24}$-alkyl but not simultaneously hydrogen, and X and Y may be alkali metal and/or ammonium ions. In formula II $R^1$ and R are preferably linear or branched $C_6$-$C_{18}$-alkyl or hydrogen, and especially alkyl of 6, 12 or 16 carbons, but are not both simultaneously hydrogen. X and Y are preferably sodium, potassium or ammonium, particular preference being given to sodium. Particularly advantageous compounds II are those in which X and Y are sodium, $R^1$ is a branched alkyl of 12 carbons and $R^2$ is hydrogen or is the same as $R^1$. Use is frequently made of technical-grade mixtures in which the proportion of the monoalkylated product is from 50 to 90% by weight, such as Dowfax® 2A1 (trade mark of Dow Chemical Company) The compounds II are widely known, for example from U.S. Pat. No. 4,269,749, and are obtainable commercially.

In addition to the ionic emulsifiers mentioned it is preferred to use at least one nonionic emulsifier in quantities of preferably from 0 to 10% by weight, in particular from 0.5 to 8% by weight, and with particular preference from 1 to 4% by weight, based in each case on the overall quantity of monomers. Appropriate nonionic emulsifiers are araliphatic or aliphatic nonionic emulsifiers, for example ethoxylated mono-, di- and trialkylphenols (EO units: 3 to 50, alkyl: $C_4$–$C_9$), ethoxylates of long-chain $C_8$–$C_{36}$ alcohols (EO units: 3 to 50), and also polyethylene oxide/polypropylene oxide block copolymers. Preference is given to ethoxylates of long-chain $C_{10}$–$C_{22}$ alkanols (mean degree of ethoxylation: 10 to 50), and of these particular preference is given to those containing linear $C_{12}$–$C_{18}$-alkyl.

The molecular weight of the polymers can be adjusted by adding small quantities, generally up to 2% by weight, based on the monomers to be polymerized, of one or more molecular weight regulators, examples being organic thio compounds, silanes, allyl alcohols or aldehydes.

The emulsion polymerization can be conducted either continuously or batchwise, preferably by a semicontinuous method, in which the monomers to be polymerized can be supplied to the polymerization batch continuously, including by a stepwise or gradient procedure.

Apart from the seed-free method in order to establish a defined polymer particle size it is also possible to conduct the emulsion polymerization with addition of seed latex or in situ preparation of seed latex. Appropriate techniques are known and can be found in the prior art (see EP-B 40 419 and Encyclopedia of Polymer Science and Technology, Vol. 5, John Wiley & Sons Inc., New York 1966, p. 847).

The pressure and temperature of polymerization are of minor importance; the latter is generally from room temperature to 120° C., preferably from 40° to 95° C. and, with particular preference, from 50° to 90° C.

Following the actual polymerization reaction it may be necessary substantially to free the novel aqueous polymer dispersions from odorous residues, such as residual monomers and other volatile organic constituents. This can be done by physical methods known per se such as distillation (especially steam distillation) or by stripping with an inert gas. The amount of residual monomer can also be reduced chemically by means of free-radical after-polymerization, especially under the action of redox initiator systems as listed in, for example, DE-A 44 35 423, DE-A 44 19 518 and DE-A 44 35 422.

The preparation of the polymers which are provided only subsequently with the functional groups (see above) can take place by the usual techniques for polymerizing ethylenically unsaturated monomers, preferably by free-radical aqueous emulsion polymerization. Suitable monomers are in principle all those mentioned under A, with the proviso that monomers containing functional groups able to undergo the desired polymer-analogous reaction (see above) are copolymerized in sufficient quantities, preferably from 0.1 to 15% by weight. In this context, dienes and the monomers mentioned under A2 are particularly suitable. Where the polymers are prepared by emulsion polymerization, the reaction conditions (emulsifiers, initiators, procedure, pressure and temperature) are subject to the comments made above.

As component b) the novel binder formulation includes at least one compound having at least two or more $NH_2$ groups per molecule. The term $NH_2$ groups embraces the amino functions of primary amines and the $NH_2$ groups in hydrazides of carboxylic or sulfonic acids, or of hydrazones. Examples of suitable amines are diamines that are also used in the synthesis of polyamides. Examples of suitable diamines are aliphatic $C_4$–$C_{16}$ diamines, especially $C_6$–$C_{12}$ diamines, such as hexamethylenediamine, its alkyl derivatives, for example 2-methylhexamethylenediamine, 3-methylhexamethylenediamine, and also bis(4-aminocyclohexyl)methane or bis(4-aminocyclohexyl) propane. Also suitable are $C_4$–$C_{20}$-alkylenediamines in which the alkylene is interrupted by one or more oxygens or by one or more NH and/or N-$C_1$–$C_4$-alkyl groups, examples being 1,10-diamino-4,7-dioxadecane, 1,12-diamino-4,9-dioxadodecane, diethylfenetriamine, triethylenetetramine, dipropylenetriamine, 1,7-diamino-4-azamethylheptane, and also $C_4$–$C_{20}$-alkoxydiamines such as bisaminooxybutane. As component b) it is preferred to use di- or poly-hydrazides of a di- or polycarboxylic acid. In particular, the dihydrazides of dicarboxylic acids are used. Suitable dihydrazides are derived in particular from aliphatic $C_2$–$C_{14}$ dicarboxylic acids or aromatic $C_8$–$C_{22}$ dicarboxylic acids. Examples of suitable aliphatic $C_2$–$C_{14}$ dicarboxylic acids are oxalic, malonic, succinic, glutaric, adipic, pimelic, suberic, azelaic and sebacic acids. Preference is likewise given to the dihydrazides of aromatic dicarboxylic acids, for example the dihydrazide of phthalic, isophthalic, terephthalic, 1,4-, 1,5- and 2,6-naphthalenedicarboxylic, 4,4-diphenyl [sic] sulfone dicarboxylic, 4,4-diphenylmethanedicarboxylic and 4,4'-diphenyl-2,2-propanedicarboxylic acids, etc. The hydrazides of these dicarboxylic acids may be employed alone, in combination or in a mixture with diamines. In addition, component b) may also comprise the compounds having more than two $NH_2$ groups. However, these compounds are used only in minor amounts. In a specific embodiment, adipic dihydrazide is employed as sole component b).

Component b), which is used in quantities of from 0.01 to 10% by weight, preferably from 0.2 to 5% by weight, based on the polymer, can be added either directly to the polymer dispersion or not until during the preparation of the coating composition. The advantageous combination of component a) and component b) in the novel coating compositions is probably a result of the fact that the crosslinking component b) is located not in the polymer phase but primarily in the aqueous phase. It can therefore be assumed that the crosslinking reaction between the $NH_2$ groups of component b) and the reactive centers of the polymer takes place only when, as a result of the aqueous phase being evaporated —ie. when the coating composition sets—the concentration of the particles increases. A further consequence of this is that the reaction takes place primarily on those reactive centers in the polymer which are located on the surface of the polymer particles. Consequently, crosslinking is first and foremost between the polymer particles and not within them. The effects of this include on the one hand an increase in the strength of the polymer films, which is in turn responsible for the strength of the coating compositions. At the same time, however, the major quantity of polymer in the polymer particles remains uncrosslinked, leading to an increased flexibility of the polymer compositions and thus of the coating compositions as well.

In accordance with the invention, the formulations of components a) and b) are used as binders for coating compositions, for example for polymer dispersion plasters, tile adhesives, paints, sealing compositions or compounds, especially those intended for porous components. With particular preference the novel formulations are used as binders in roofing compositions for polyurethane foams.

Such coating compositions generally contain from 40 to 95% by weight, preferably from 60 to 90% by weight, and in particular, from 65 to 85% by weight of nonvolatile constituents. Of these, from about 10 to 95.5% by weight, preferably from 10 to 50% by weight and, in particular, from 20 to 40% by weight is accounted for by the solids in the binder, from 0.01 to 60% by weight, preferably from 4 to 60% by weight, in particular from 20 to 60% by weight and, with particular preference, from 30 to 55% by weight by fillers, from 0 to 60% by weight, preferably from 0 to 20% by weight, by pigments, and from 0.5 to 25% by weight, preferably from 1 to 10% by weight, by auxiliaries.

Examples of suitable fillers are aluminosilicates, silicates, alkaline earth metal carbonates, preferably calcium carbonate in the form of calcite or chalk, dolomite, and also aluminum silicates or magnesium silicates, such as talc.

An example of a typical pigment is titanium dioxide, preferably in the rutile form. However, the coating compositions—especially if used for decorative purposes—may also include colored pigments, for example iron oxides.

The customary auxiliaries include wetting agents such as sodium or potassium polyphosphates, polyacrylic acids, the alkali metal salts thereof, polyvinyl alcohols, etc. These coating compositions furthermore generally include substances which modify the viscosity, for example cellulose ethers, such as hydroxyethylcellulose. They may also contain added dispersants, defoamers, preservatives, hydrophobicizing agents, biocides, dyes, fibers or further constituents. The coating compositions may also include plasticizers in order to modify the film-forming properties of the binder polymers.

The novel coating compositions can contain from 0.1 to 5% by weight of photosensitive initiators, whose purpose is to induce crosslinking reactions in the surface of the coating and thus to reduce the tackiness of the surface. The use of photoinitiators in coating compositions is described, for example, in EP-A 010 000, in DE-A-4 318 083 or in EP-A 624 610. Suitable photosensitizers include a group which is capable of absorbing a fraction of sunlight. The photoinitiator can be added to the binder either in the form of a photosensitive compound or in the form of a photosensitive oligomeric or polymeric additive. It is also possible to bind the photosensitive group chemically to the polymer, for example through copolymerization.

Preferred photosensitive compounds are benzophenone derivatives in which one or both phenyl rings may be substituted by, for example, $C_1$–$C_4$-alkyl, hydroxyl, chloro, carboxy-$C_1$–$C_4$-alkyl, nitro, amino, etc. Examples of suitable benzophenone derivatives include 4-methyl-, 4-hydroxy-, 4-amino-, 4-chloro-, 4-carboxy-, 4,4'-dimethyl-, 4,4'-dichloro-, 4-carboxymethyl- and 3-nitrobenzophenone. Substituted phenyl ketones are also suitable, for example substituted phenylacetophenones and the like. Particular preference is given to benzophenone or a 4-substituted benzophenone. If desired, such photoinitiators are used in quantities of from 0.1 to 5% by weight, based on the binder polymer.

Polymers containing photosensitive groups in chemically bonded form are prepared, for example, by copolymerization with monomers carrying photosensitive groups. Such comonomers are generally used in quantities of from 0.5 to 5% by weight, based on the monomers to be polymerized. Polymers containing photosensitive groups are disclosed in U.S. Pat. Nos. 3,429,852, 3,574,617 and 4,148,987, for example. Suitable monomers include allyl benzoylbenzoates or vinyl benzoylbenzoates. Preference is given to vinylbenzylmethyl benzoylbenzoate, hydroxymethacryloyloxypropylmethyl benzoylbenzoate, hydroxymethacryloyloxypropyl benzoylbenzoate and hydroxymethacryloyloxypropoxybenzophenone.

The novel coating compositions are notable for high adhesiveness on hydrophobic substrates such as polyurethane foams or components made from polyolefins, such as polyethylene, polypropylene, EPM and/or EPDM plastics, both in the wet and in the dry state. The surface of the coatings is non-tacky and its soiling tendency is low. The coatings combine high tear strength with a similarly high level of extensibility, and their propensity for taking up water is low.

It has surprisingly been found that the novel binder formulations are suitable for the preparation of sealing compositions. Sealing compositions thus prepared are likewise provided by the present invention. The novel sealing compositions can be used, for example, to seal off cracks, fissures or joints or for filling holes or indentations. Owing to their high extensibility or tear strength and their good adhesion to substrates of different polarity, sealing compositions of this type can be used in particular to seal off expansion joints (joints formed by the meeting of different components, where the width of the joint may alter as a result of mechanical or thermal effects). The novel sealing compositions are suitable, for example, for sealing the joints between window frames and panes of glass, between components installed in the masonry, such as windows, doors or air vents, and the masonry itself, between individual tiles (grouting), or between tiles and sanitary installations, etc. Using the novel sealing compositions it is possible to seal off a very wide variety of different substrates, such as mineral substrates, eg. masonry, concrete, tiles, ceramic, or metals, eg. aluminum, steel, zinc-plated metals, plastics, eg. PVC, EPDM plastics, wood, either untreated or coated with varnishes and paints, etc.

Sealing compositions of this kind generally contain from 50 to 95% by weight, preferably from 60 to 90% by weight, and, in particular, from 65 to 85% by weight of nonvolatile constituents. Of these, from about 10 to 95.5% by weight, preferably from 10 to 50% by weight and, in particular, from 20 to 40% by weight is accounted for by the solids of components a) and b) which are present in the binder from 4 to 60% by weight, in particular from 20 to 60% by weight and, with particular preference, from 30 to 55% by weight by fillers, from 0 to 60% by weight, preferably from 0 to 20% by weight, by pigments, and from 0.5 to 25% by weight, preferably from 1 to 10% by weight, by the abovementioned auxiliaries. Suitable fillers and pigments are those mentioned above. The particular composition depends in a manner familiar to the skilled worker on the particular application intended.

The examples which follow are intended to illustrate the invention without limiting it.

1. Preparation and characterization of the polymer dispersions

The particle size (Z mean) of the polymer particles was determined by dynamic light scattering on a 0.01% by weight dispersion at 23° C. using an autosizer IIc from Malvern Instruments, England. The parameter stated is the mean diameter of the cumulant z-average of the measured autocorrelation function.

COMPARISON EXAMPLE 1

A vessel with stirrer and reflux condenser was charged with 250 parts of deionized water and 1.26 parts of a 1.4% strength solution of Na/Fe EDTA complex in water. It was then flushed with inert gas and heated to 70° C. When this temperature was reached, 21.5 parts of the feed stream 1, 17.7 parts of feed stream 2 and 15.7 parts of feed stream 3 were introduced into the reactor. Initial polymerization then took place for 30 minutes. The remaining amount of feed stream 1 was then introduced into the reactor over the course of 3 h, and the remaining amounts of feed streams 2 and 3 were metered in to the reactor, beginning simultaneously, each over the course of 4 h. Reaction was then allowed to continue at 70° C. for one hour. Thereafter, with the aim of reducing the content of residual monomer, 1.14 g of a 70% strength by weight aqueous solution of t-butyl hydroperoxide and 6.11 g of a 13.1% strength by weight aqueous solution of the bisulfite adduct of acetone were added and reaction was allowed to continue at 70° C. for 30 minutes. The batch was then cooled to room temperature and the pH was adjusted to 8.0 using 10% strength sodium hydroxide solution. The dispersion obtained had a solids content of 55.3% by weight, with a mean particle diameter of 260 nm.

| Feed stream 1: | |
|---|---|
| Emulsion of | |
| 179 parts | of water |
| 17.78 parts | of Dowfax ® 2A1 (45% strength by weight solution in water) |
| 60 parts | of ethoxylated $C_{16}$–$C_{18}$ fatty alcohol with a mean degree of ethoxylation of 18 (20% strength by weight solution in water) |
| 160 parts | of 2-ethylhexyl acrylate |
| 520 parts | of n-butyl acrylate |
| 120 parts | of methyl methacrylate |
| 16 parts | of methacrylic acid (50% strength by weight solution in water) |
| Feed stream 2: | |
| 18.3 parts | of acetone bisulfite (13.1% strength by weight solution in water) |
| 70 parts | of water |
| Feed stream 3: | |
| 3.4 parts | of t-butyl hydroperoxide (70% strength by weight solution in water) |
| 70 parts | of water |

COMPARISON EXAMPLE 2

0.45% by weight (based on the polymeric solids content of the dispersion) of adipic dihydrazide was added to the dispersion from Comparison Example 1.

Example 1

The polymer dispersion was prepared as described in Comparison Example 1 except that the composition of feed stream 1 was as follows:

| 179 parts | of water |
|---|---|
| 17.78 parts | of Dowfax ® 2A1 (45% strength by weight solution in water) |
| 60 parts | of ethoxylated $C_{16}$–$C_{18}$ fatty alcohol with a mean degree of ethoxylation of 18 (20% strength by weight solution in water) |
| 152 parts | of 2-ethylhexyl acrylate |
| 520 parts | of n-butyl acrylate |
| 104 parts | of methyl methacrylate |
| 24 parts | of diacetone acrylamide |
| 16 parts | of methacrylic acid (50% strength by weight solution in water) |

The resulting dispersion had a solids content of 55% by weight; and a pH of 8.3. The mean polymer particle diameter ($d_{50}$) was 280 nm.

EXAMPLE 2

0.225% by weight of adipic dihydrazide (ADDH; based on the polymeric solids content of the dispersion) was added to the dispersion from Example 1.

EXAMPLE 3

0.45% by weight of ADDH (based on the polymeric solids content of the dispersion) was added to the dispersion from Example 1.

2. Preparation of the coating compositions

The novel coating compositions were prepared by blending the following components in the stated sequence with the dispersions from Examples 1 to 3 and Comparison Examples 1 and 2, in a dissolver.

| Dispersion (55%) | 32.2 parts |
|---|---|
| Defoamer[1] | 0.5 part |
| Propylene glycol | 2.3 parts |
| Dispersant[2] | 0.5 part |
| Titanium pigment (rutile, 0.3µ) | 11.5 parts |
| Calcium carbonate (10 µm) | 27.0 parts |
| Calcium carbonate (2 µm) | 1.4 parts |
| Talc (6 µm) | 8.5 parts |
| Commercial biocide[3] | 0.2 part |
| Dispersion (55%) | 14.0 parts |
| Defoamer[1] | 0.5 part |
| Water | 1.5 parts |

[1]BYK 035 defoamer (BYK Chemie, Wallingford CT, USA)
[2]Dispersant Calgon ® TK, BK-Ladenburg GmbH, Germany
[3]1,2-Benzoisothiazolin-3-one 3. Adhesion test Blocks of commercial polyurethane foam for roof construction (roof grade 3lb/cubic foot) from American Coatings of Greensboro (Greensboro, N.C.) were coated over an area >25.4 mm×250 mm with the coating compositions from 2. A glass fiber mat measuring 25.4 mm×250 mm was then placed lengthwise over the coated area. After 4 h at room temperature a further coating with the novel coating compositions was applied to the glass fiber mat and the coating system was dried at room temperature for 14 days. The bonding strength is the force per unit area required to remove the glass fiber mat from the polyurethane surface. This force was determined by traction at an angle of 180° to the stuck-on glass fiber mat at a pulling rate of 2 inches per minute. For adhesion in the wet state, the specimen was immersed with the area to be tested in water for 14 days and was then subjected to the test. The results are compiled in Table 1.

4. Tear strength and extensibility

The coating compositions were knife-coated onto a Teflon-coated surface so as to give a dry film thickness of from 0.3 to 0.4 mm. After drying in air for 4 h, a further coat of the same thickness was applied. After 1 to 2 days, the film was carefully removed from the Teflon surface and was hung vertically for 14 days at 23° C. and 50% atmospheric humidity.

Tear strength and elongation at break were determined with an Instron tensile tester in accordance with DIN 53455 and 53504. The measurements given are each mean values of 5 measurements of 5 test specimens, which were punched out from the films. The specimen format used was the dumbbell format described as standard rod S2 in DIN 53504. The thickness of the samples was checked with a thickness-measuring device in accordance with DIN 53370 on samples with a circular button form of 10 mm in diameter. The specimens were locked into the clamps of a tensile testing machine and were torn at a pulling speed of 5 mm/minute. The elongation at break is the elongation at the instant of tearing, at 23° C. and 1 atm. It is given as $[(l-l_0)/l_0]\times 100$ (%), where $l_0$=original measured length and l=measured length on tearing. Correspondingly, the tear strength is the strength which has to be exerted at the instant of tearing. It is usually indicated relative to the cross-section. The results are compiled in Table 1.

5. Determination of water resistance

The films prepared in accordance with 4. were weighed, placed in water, dried after 96 h and weighed again. The percentage increase in weight is a measure of the water uptake (Table 1).

6. Determination of surface tack

The surface tack of coatings prepared analogously to those for the bonding strength test (see 3.) was determined by the finger test method. The results are compiled in Table 1.

4. A method as claimed in claim 1, wherein the polymer in component a) has a glass transition temperature in the range from −60° to +50° C.

5. A method as claimed in claim 1, in which the polymer in component a) is obtained by free-radical copolymerization of at least one ethylenically unsaturated monomer A with at least one ethylenically unsaturated monomer B of the formula I $$R^7\text{—CH}=C(R^6)\text{—X—Y—}R^1 \qquad (I)$$

where

R6 is hydrogen or methyl, $R^7$ is hydrogen, alkyl, aryl, aralkyl or —X—Y——$R^1$ and X, Y and $R^1$ are as defined in claim 1.

TABLE 1

| Examples | DAAM/ADDH[1] (pphm/pphm) | Adhesion to PU foam[2] dry | Adhesion to PU foam[2] wet | Tear strength (N/mm²) | Elongation at break (%) | Water uptake (%) | Surface tack |
|---|---|---|---|---|---|---|---|
| CE 1 | 0/0 | 0 | 0 | 0.60 | 650 | 12.4 | tacky |
| CE 2 | 0/0.45 | 0 | 0 | 0.60 | 600 | 11.9 | tacky |
| E 1 | 3.0/0 | 0 | 0 | 0.46 | 500 | 9.8 | tacky |
| E 2 | 3.0/0.225 | 3 | 2 | 0.90 | 350 | 6.4 | little |
| E 3 | 3.0/0.45 | 3 | 3 | 1.20 | 130 | 6.1 | none |

[1]DAAM = diacetoneacrylamide; ADDH = adipic dihydrazide; pphm = parts per hundred monomer
[2](PLI = pounds per linear inch)
0: 0–0.5 PLI (0–0.09 kg/cm) adhesive fracture
1: 0.6–2.0 PLI (0.10–0.36 kg/cm) adhesive fracture
2: 2.1–4.0 PLI (0.37–0.71 kg/cm) cohesive fracture, tearing of the glass fiber mat
3: 4.1–8.0 PLI (0.72–1.43 kg/cm) cohesive fracture, tearing of the glass fiber mat

We claim:

1. A method of coating a substrate comprising applying to a substrate a coating composition whose binder is a formulation comprising as component a) at least one aqueous dispersion of a polymer having functional groups —X—Y—$R^1$, where $R^1$ is hydrogen, alkyl, aryl or aralkyl, Y is C=O or an oxirane ring, —X—is a single bond, alkylene, arylene, —$R^2$—O—$R^3$, —$R^2$—Z—O—$R^3$—, —$R^2$—Z—$CH_2$—$R^3$—, —$R^2$—Z—N($R^4$)—$R^3$—, —$R^2$—O—Z—O—$R^3$, —$R^2$—O—Z—$CH_2$—$R^2$—O—Z—N($R^4$)—$R^3$—, —$R^2$N—($R^5$)—Z—O—$R^3$—, —$R^2$—N($R^5$)—Z—$CH_2$—$R^3$—, —$R^2$—N($R^5$)—Z—N($R^4$)—$R^3$—, where —$R^2$—is a single bond, alkylene, oxyalkylene, polyoxyalkylene or arylene and is attached to the polymer, —$R^3$—is alkylene or arylene and is attached to Y, Z is $SO_2$ or C=O, and $R^4$ and $R^5$ independently are hydrogen, alkyl, aryl, aralkyl or a group —$R^3$—Y—$R^1$, where Y, $R^1$ and $R^3$ are as defined above, wherein said polymer does not comprise polymerized crosslinking monomers, and as component b) at least one compound having at least two $NH_2$ groups per molecule.

2. A method as claimed in claim 1, wherein the substrate to be coated is hydrophobic.

3. A method as claimed in claim 2, wherein the hydrophobic substrate is a polyurethane foam.

6. A method as claimed in claim 5, wherein the monomer B is selected from the group consisting of bisacetonylacrylamide or bisacetonylmethacrylamide.

7. A method as claimed in claim 5, wherein the monomer B makes up from 0.1 to 10% by weight of the overall quantity of monomers.

8. A method as claimed in claim 5, wherein the monomer A comprises from 80 to 99.9% by weight of vinyl aromatic monomers, $C_1$–$C_{12}$-alkyl vinyl ethers, vinyl or allyl esters of $C_1$–$C_{18}$ monocarboxylic acids, esters of α,β-unsaturated $C_3$–$C_8$ mono- or dicarboxylic acids or nitriles thereof and/or $C_4$–$C_8$ conjugated dienes, and from 0.1 to 20% by weight of modifying monomers.

9. A method as claimed in claim 1, wherein component b) is a di- or polyhydrazide of a di- or poly-carboxylic acid.

10. A method as claimed in claim 9, wherein component b) is selected from the dihydrazides of aliphatic $C_2$–$C_{14}$ dicarboxylic acids and the dihydrazides of aromatic $C_8$–$C_{22}$ dicarboxylic acids.

11. A method as claimed in claim 10, wherein component b) used is the dihydrazide of adipic acid.

12. A method as claimed in claim 1, wherein component b) makes up from 0.01 to 5% by weight, based on the polymer content of component a).

13. A method of sealing comprising coating according to the method of claim 1.

14. A method of sealing using a sealing composition comprising from 10 to 95.5% by weight of a formulation defined as in claim 1, from 5 to 60% by weight of fillers from 0 to 60% by weight of pigment and from 0.5 to 25% by weight of auxiliaries.

15. The method of claim 1, wherein said polymer in component a) has a glass transition temperature of below 25° C.

* * * * *